(12) United States Patent
Chen et al.

(10) Patent No.: US 12,292,086 B2
(45) Date of Patent: May 6, 2025

(54) BEARING SEAT DEVICE

(71) Applicant: Hold Well Industrial Co., Ltd., Taichung (TW)

(72) Inventors: Kuan-Ta Chen, Taichung (TW); Shih-Ying Huang, Taichung (TW)

(73) Assignee: Hold Well Industrial Co., Ltd., Taichung (TW)

( * ) Notice: Subject to any disclaimer, the term of this patent is extended or adjusted under 35 U.S.C. 154(b) by 166 days.

(21) Appl. No.: 18/085,846

(22) Filed: Dec. 21, 2022

(65) Prior Publication Data

US 2023/0204075 A1  Jun. 29, 2023

(30) Foreign Application Priority Data

Dec. 23, 2021 (TW) ................................ 110148471

(51) Int. Cl.
 *F16C 35/067* (2006.01)
 *B23Q 5/06* (2006.01)
 *F16C 35/06* (2006.01)
 *F16C 35/12* (2006.01)

(52) U.S. Cl.
 CPC .............. *F16C 35/067* (2013.01); *B23Q 5/06* (2013.01); *F16C 35/061* (2013.01); *F16C 35/12* (2013.01)

(58) Field of Classification Search
 CPC .... F16C 35/042; F16C 35/061; F16C 35/062; F16C 35/067; F16C 35/12; F16C 2322/39
 See application file for complete search history.

(56) References Cited

U.S. PATENT DOCUMENTS

| 2,772,127 A * | 11/1956 | Sborlino | F16C 35/042 |
| | | | 29/898.07 |
| 10,265,817 B2 * | 4/2019 | Sanders | F01D 15/06 |
| 10,763,720 B2 * | 9/2020 | Horng | H02K 5/24 |

FOREIGN PATENT DOCUMENTS

TW  I697381  7/2020

* cited by examiner

*Primary Examiner* — James Pilkington
(74) *Attorney, Agent, or Firm* — Burris Law, PLLC

(57) ABSTRACT

The bearing seat device includes a bearing seat, a bearing set, a driven module, and an adjusting member. The bearing seat has a mounting hole, an adjusting slot, and an inserting hole. The adjusting slot divides a section of the bearing seat that is adjacent to the inserting hole and the mounting hole into a first side compartment and a second side compartment. The inserting hole extends from the first side compartment to the second side compartment. The bearing set is mounted in the mounting hole. The driven module extends into the mounting hole, is supported by the bearing set, and is rotatable relative to the bearing seat. The adjusting member engages the mounting hole and is operable to adjust a width of the adjusting slot between the first and the second side compartments and a diameter of the mounting hole.

3 Claims, 6 Drawing Sheets

BEARING SEAT DEVICE

CROSS-REFERENCE TO RELATED APPLICATION

This application claims priority to Taiwanese Invention patent application No. 110148471, filed on Dec. 23, 2021.

FIELD

The disclosure relates to a bearing seat device, and more particularly to a bearing seat device for installation of a bearing set.

BACKGROUND

Referring to FIG. 6, a conventional turbine power unit is disclosed in Taiwanese Invention U.S. Pat. No. 1,697,381. The conventional turbine power unit includes a turbine casing 120. The turbine casing 120 has an internal space 112, a fluid driven turbine 170 that is rotatably mounted in the internal space 112, two bearings 150, 160 that are mounted in the internal space 112 and that are located respectively at two opposite sides of the fluid driven turbine 170, a shaft 110 extending through the fluid driven turbine 170, and a cover 130 covering one of the bearings 150, 160. The internal space 112 has two opposite service openings 127, 128, and the cover 130 removably covers one of the service openings 127, 128 of the internal space 112. The service openings 127, 128 allow the entry or removal of the bearings 150, 160 into the internal space 112 of the turbine casing 120, when the bearings 150, 160 need to be installed, replaced or serviced. The cover 130 switches between an open configuration in which the bearings 150, 160 may be mounted or removed from the internal space 112 of the turbine casing 120 via the service openings 127, 128, and a closed configuration in which the bearings 150, 160 have been securely installed and are ready to operate in the turbine casing 120.

Although the conventional turbine power unit may fulfill expected operational requirements, the disassembly, installation and servicing of the bearings 150, 160 are time consuming.

SUMMARY

Therefore, an object of the disclosure is to provide a bearing seat device that can alleviate at least one of the drawbacks of the prior art.

According to the disclosure, the bearing seat device includes a bearing seat, a bearing set, a driven module, and an adjusting member. The bearing seat has a mounting hole, an adjusting slot, and an inserting hole. The adjusting slot is spatially communicated with the mounting hole. The inserting hole is spatially communicated with the adjusting slot. The adjusting slot divides a section of the bearing seat that is adjacent to the inserting hole and the mounting hole into a first side compartment and a second side compartment. The inserting hole extends from the first side compartment to the second side compartment. The bearing set is mounted in the mounting hole. The driven module extends into the mounting hole, is supported by the bearing set, and is rotatable relative to the bearing seat. The adjusting member engages the mounting hole, and is operable to adjust a width of the adjusting slot between the first and the second side compartments and a diameter of the mounting hole.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
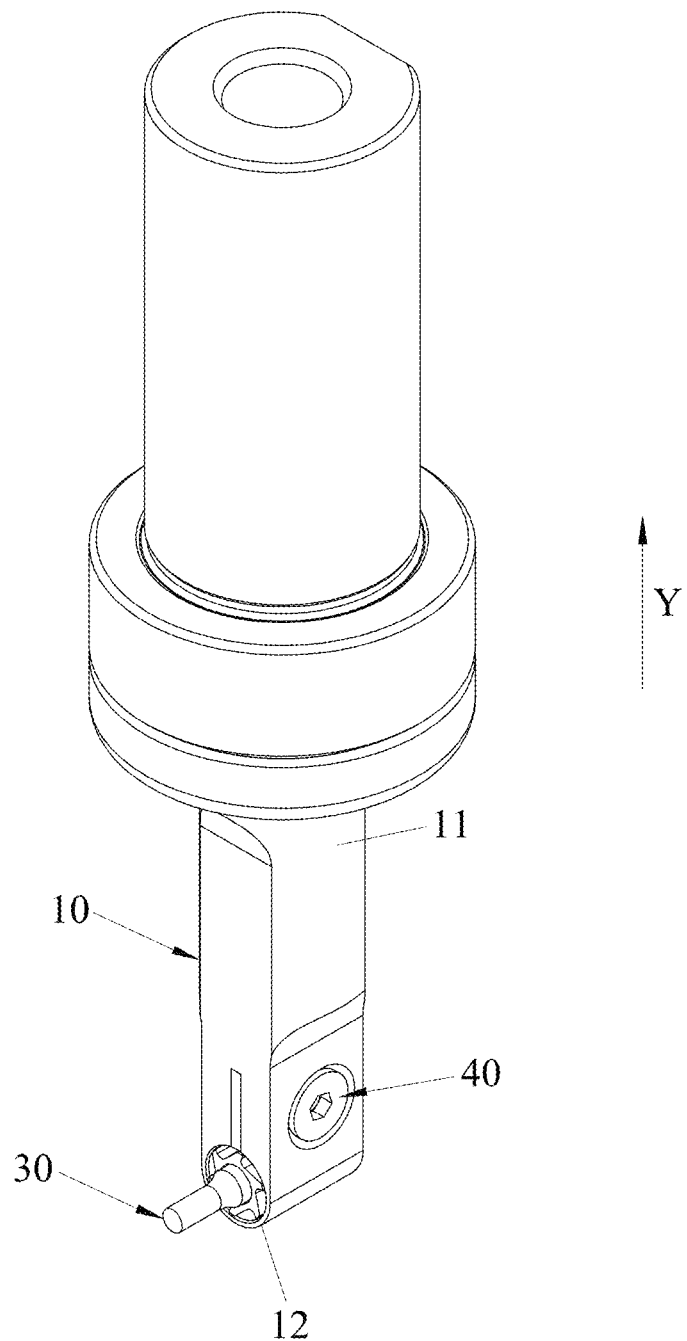
FIG. 1 is a perspective view of an embodiment of a bearing seat device according to the present disclosure.
Figure 2:
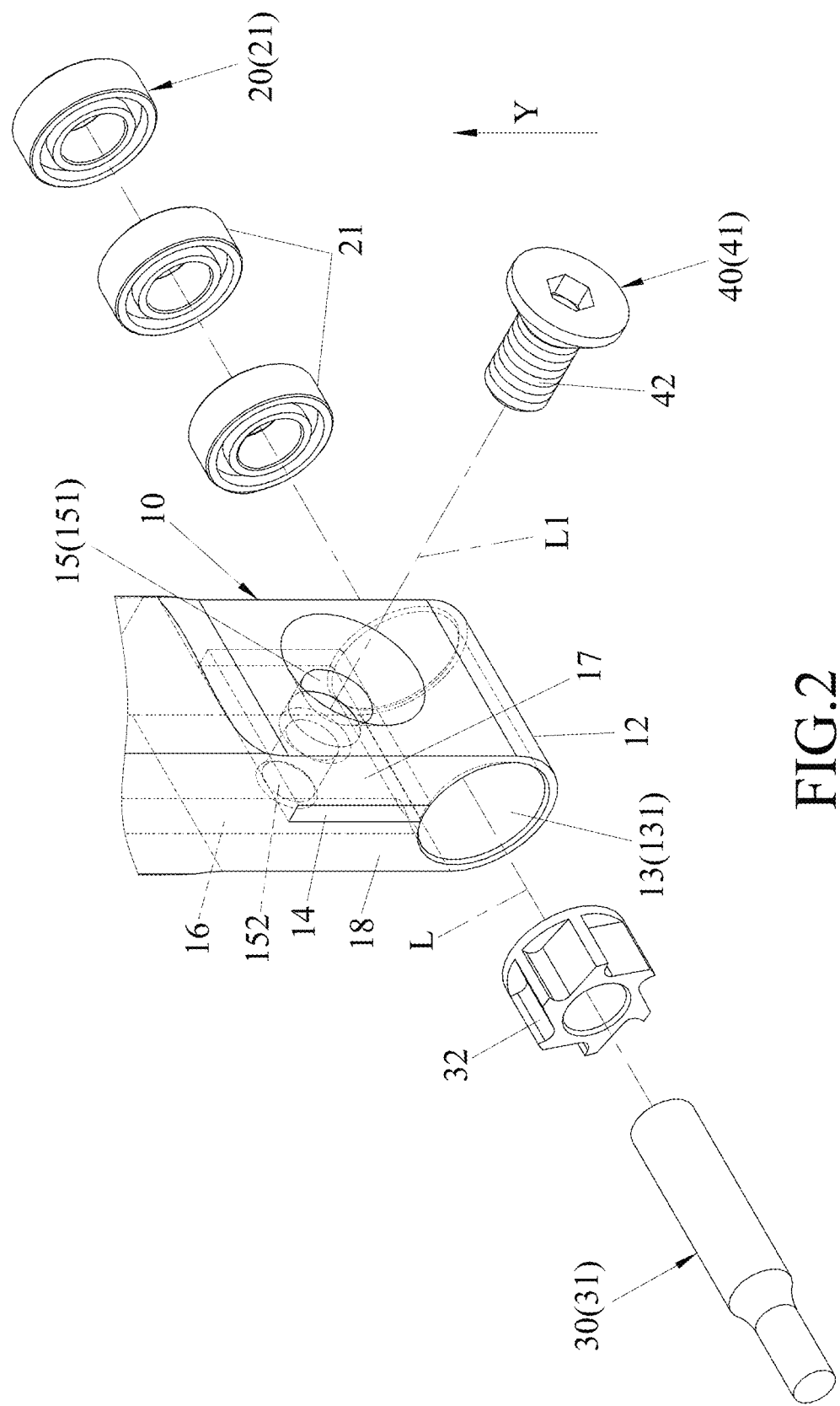
FIG. 2 is a fragmentary exploded and schematic perspective view of the embodiment.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 1 to 5, an embodiment of a bearing seat device according to the present disclosure is shown. The bearing seat device includes a bearing seat 10, a bearing set 20, a driven module 30, and an adjusting member 40.

The bearing seat has a top end portion 11, a bottom end portion 12 that is opposite to the top end portion 11 in a vertical direction (Y), a mounting hole 13 that extends along a central axis (L) perpendicular to the vertical direction (Y), an adjusting slot 14 that is spatially communicated with the mounting hole 13, and that is extending along a direction parallel to the vertical direction (Y), an inserting hole 15 that is spatially communicated with the adjusting slot 14, and an air supply passage 16 that is spatially communicated with the mounting hole 13, and that extends in the vertical direction (Y). The bearing seat 10 further has an inner surrounding surface 131 that is disposed in the bottom end portion 12, that surrounds the central axis (L), and that defines the mounting hole 13. The adjusting slot 14 is not in spatial communication with the top end portion 11, and the adjusting slot 14 extends radially from the mounting hole 13 with respect to the central axis (L). The adjusting slot 14 divides a section of the bearing seat 10 that is adjacent to the inserting hole 15 and the mounting hole 13 into a first side compartment 17 and a second side compartment 18. The inserting hole 15 extends from the first side compartment 17 to the second side compartment 18. In this embodiment, the inserting hole 15 extends along a transverse axis (L1) which is perpendicular to the central axis (L) and the vertical direction (Y). The inserting hole 15 has a funnel-shaped section 151 disposed in the first side compartment 17, and a threaded section 152 disposed in the second side compartment 18.

The bearing set 20 is mounted in the mounting hole 13, and has a plurality of bearings 21 that are aligned along the central axis (L). In this embodiment, there are three bearings 21.

The driven module 30 extends into the mounting hole 13, is supported by the bearing set 20, and is smoothly rotatable relative to the bearing seat 10. The driven module 30 includes a driven member 31 that extends into and is supported by the bearing set 20, and a turbine 32 that is mounted to the driven member 31, that is positioned at one side of the bearing set 20 along the central axis (L), and that is adapted to be driven rotatably by pressurized air supplied from the air supply passage 16. In this embodiment, the turbine 32 corresponds in position to the air supply passage 16 and is located at a bottom end of the air supply passage 16, and the driven member 31 is a cutting tool.

The adjusting member 40 engages the mounting hole 15, and has a head part 41 that is secured to the funnel-shaped section 151 of the inserting hole 15, and a threaded part 42 that is threaded to the threaded section 152 of the inserting hole 15. The adjusting member 40 is operable to adjust a width of the adjusting slot 14 between the first and second side compartments 17, 18 and a diameter of the mounting hole 13. In this embodiment, the adjusting member 40 adjusts the width of the adjusting slot 14 and the diameter of the mounting hole 13 via a screwing action which adjusts how much the threaded part 42 is threaded to the threaded section 152 of the inserting hole 15. The adjustment member 40 is movable between a loosened position where the width of the adjusting slot 14 is greater and the diameter of the mounting hole 13 is greater, and a tightened position where the width of the adjusting slot 14 is smaller and the diameter of the mounting hole 13 is smaller.

Figure 3:
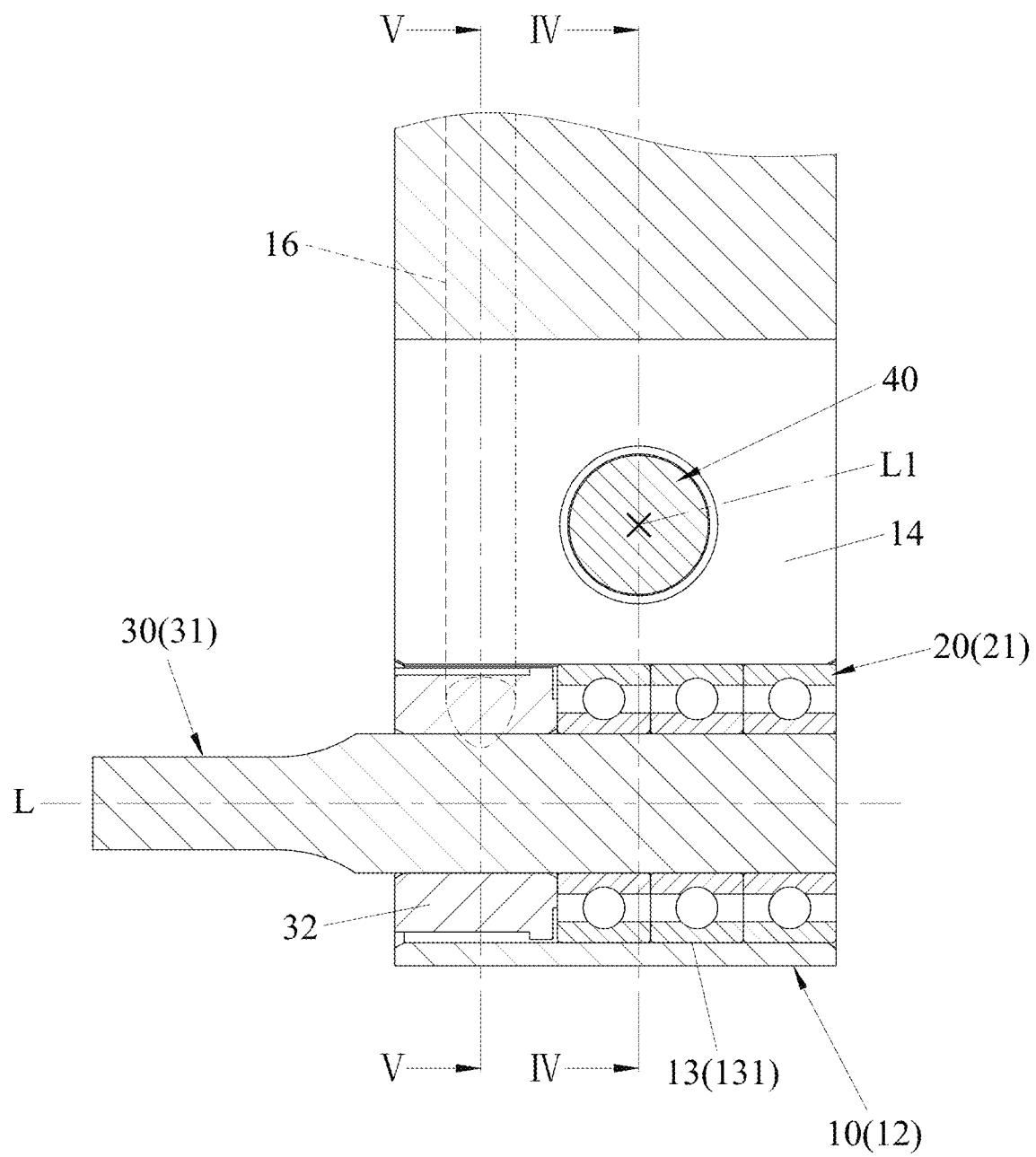
FIG. 3 is a fragmentary schematic sectional view of the embodiment.
Figure 4:
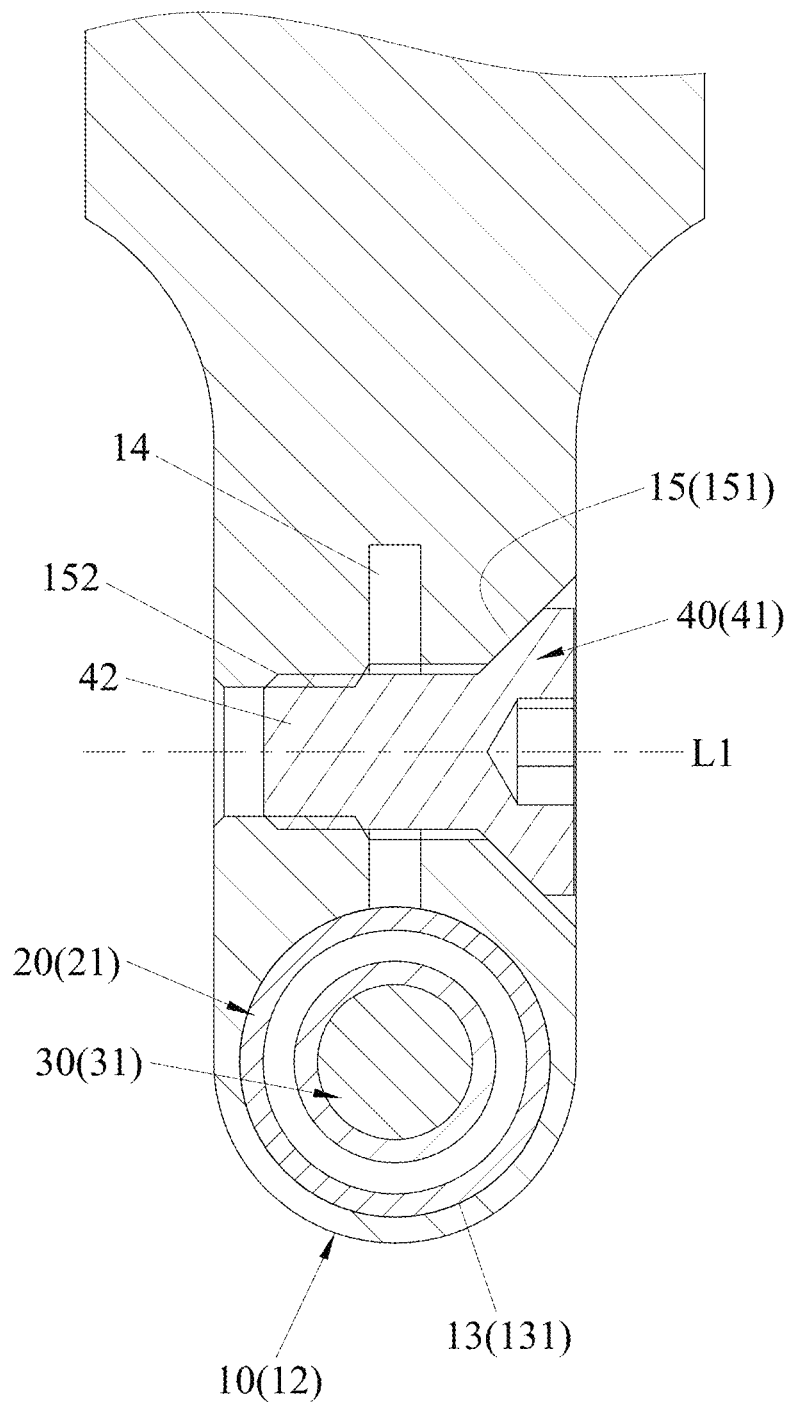
FIG. 4 is a sectional view taken along line IV-IV in FIG. 3.
Figure 5:
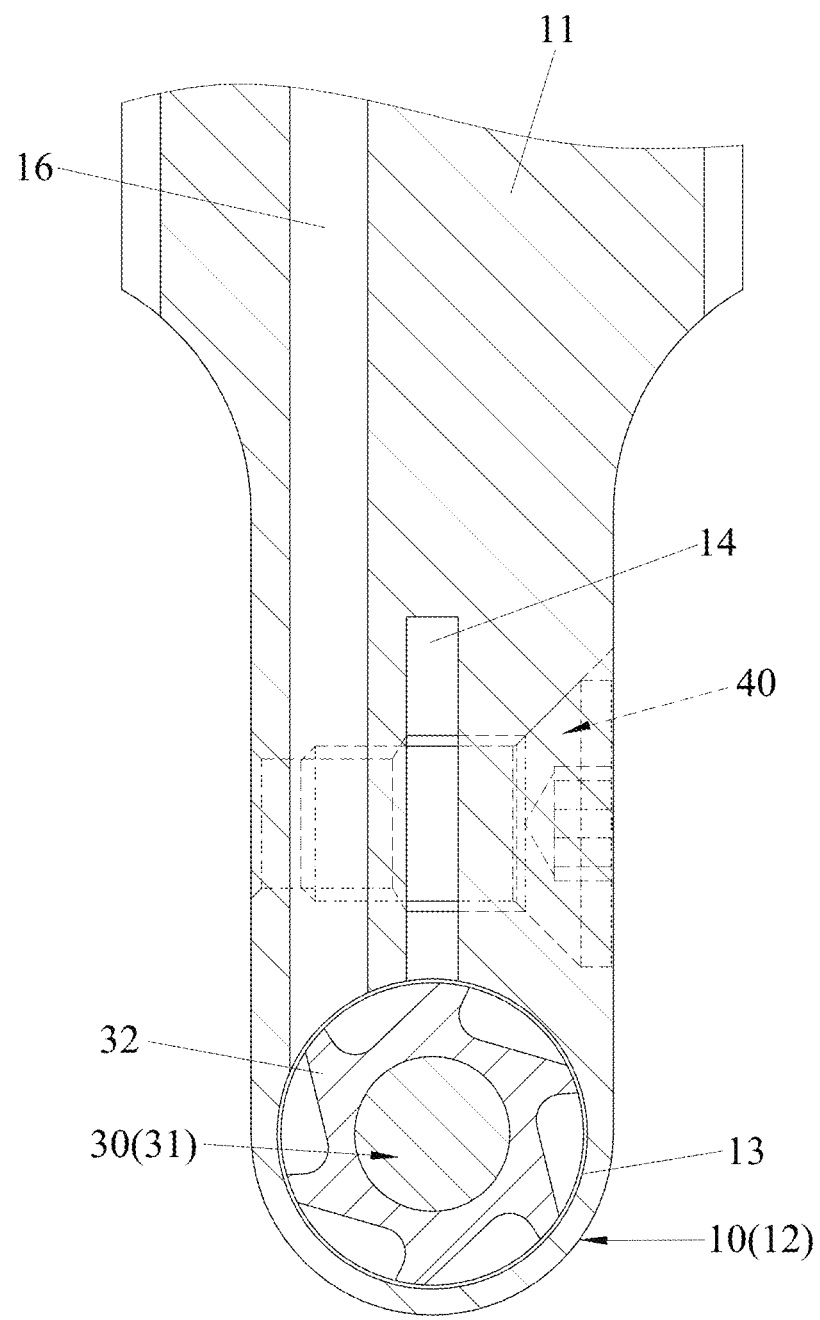
FIG. 5 is a sectional view taken along line V-V in FIG. 3.
Figure 6:
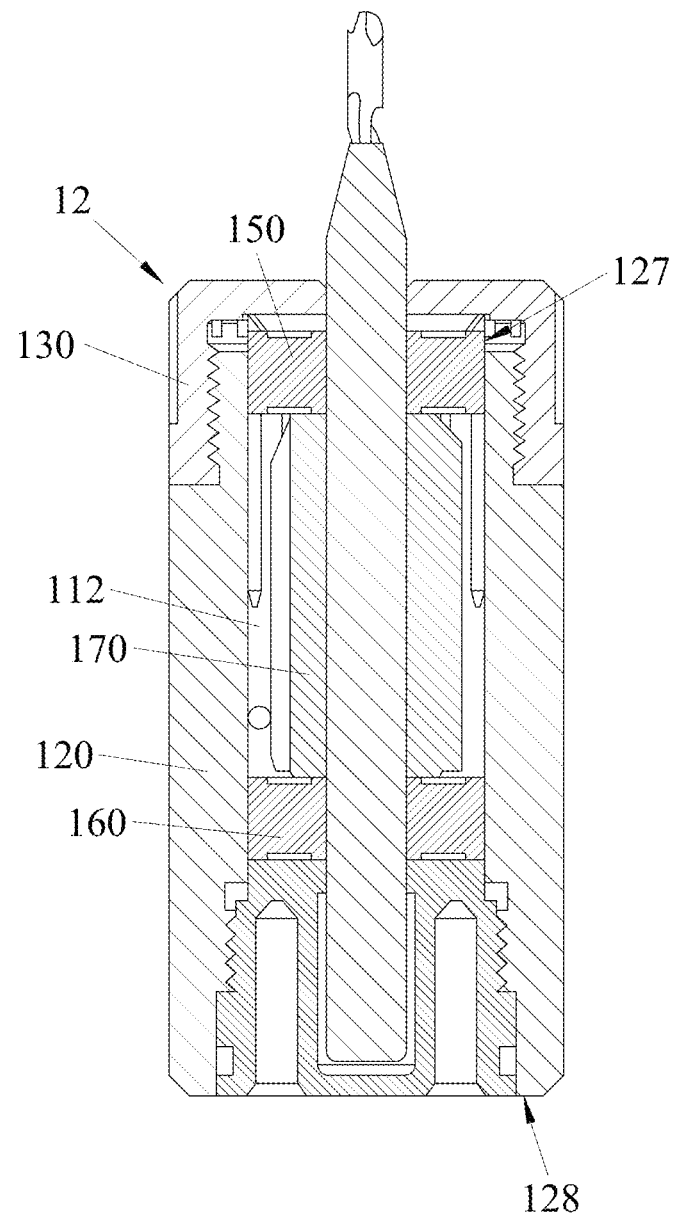
FIG. 6 is a sectional view of a conventional turbine power unit.

Referring to FIGS. 1, 3 and 5, when the adjusting member 40 is in the tightened position, the width of the adjusting slot 14 between the first side compartment 17 and the second side compartment 18 is small, the mounting hole 13 becomes smaller in diameter, so that the bearings 21 of the bearing set 20 are tightened and fixed in positioned by the inner surrounding surface 131 of the mounting hole 13, while the turbine 32 of the driven set 30 is not tightened and can rotate smoothly relative to the bearing seat 10. It should be noted that in this embodiment, the turbine 32 is smaller in diameter than the mounting hole 13, thus the turbine 32 will not be tightened when the adjusting member 40 is in the tightened position. When an air pressure generator (not shown) forces pressurized air into the air supply passage 16, the pressurized air will move toward the mounting hole 13, reach the turbine 32 and drive the driven member 31 to rotate.

When the adjusting member 40 is in the loosened position, the width of the adjusting slot 14 between the first side compartment 17 and the second side compartment 18 is greater than in the tightened position, and the diameter of the mounting holes 13 is also greater so that there is a clearance between the bearings 21 and the inner surrounding surface 131. The clearance between the bearings 21 and the inner surrounding surface 131 allows the bearings 21 and the driven set 30 to be easily detached from the mounting hole 13.

In other words, the bearing set 20 can be easily mounted or removed relative to the mounting hole 13 in the bearing seat device of the present disclosure just by operating the adjusting member 40. Therefore, the bearing set 20 can be easily serviced or replaced which can save time and reduce costs.

In summary of the above, the bearing seat device according to the present disclosure has a simple structure and is easy to operate, thereby achieving the object of the present disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A bearing seat device comprising:
    a bearing seat having
        a mounting hole,
        an adjusting slot that is spatially communicated with said mounting hole, and
        an inserting hole that is spatially communicated with said adjusting slot, said adjusting slot dividing a section of said bearing seat that is adjacent to said inserting hole and said mounting hole into a first side compartment and a second side compartment, said inserting hole extending from said first side compartment to said second side compartment;
    a bearing set mounted in said mounting hole;
    a driven module extending into said mounting hole, supported by said bearing set, and being rotatable relative to said bearing seat; and
    an adjusting member engaging said inserting hole, and being operable to adjust a width of said adjusting slot between said first and second side compartments and a diameter of said mounting hole;
    wherein said bearing seat further has a top end portion;
    wherein said mounting hole of said bearing seat extends along a central axis, said adjusting slot extending radially from said mounting hole with respect to the central axis toward said top end portion of said bearing seat, and being not in spatial communication with said top end portion of said bearing seat; and
    wherein a length of said mounting hole along the central axis is equal to a length of said adjusting slot along the central axis.

2. The bearing seat device as claimed in claim 1, wherein:
said bearing seat further includes an air supply passage that is spatially communicated with said mounting hole;
said driven module includes a driven member that that extends into and is supported by said bearing set, and a turbine that is mounted to said driven member, that is positioned at one side of said bearing set along the central axis, and that is adapted to be driven rotatably by pressurized air supplied from said air supply passage.

3. The bearing seat device as claimed in claim 2, wherein said driven member is a cutting tool.

\* \* \* \* \*